United States Patent [19]

Broadus et al.

[11] Patent Number: 4,577,488
[45] Date of Patent: Mar. 25, 1986

[54] APPARATUS AND METHOD FOR INSPECTING WELDS

[76] Inventors: Ronnie J. Broadus; Randall Slade, both of P.O. Box 418, Belle Chasse, La. 70037

[21] Appl. No.: 663,563

[22] Filed: Oct. 22, 1984

[51] Int. Cl.⁴ ............................................. G01M 3/04
[52] U.S. Cl. .......................................... 73/40; 73/46; 228/103
[58] Field of Search ...................... 73/40, 46; 228/103, 228/56.5; 374/5

[56] References Cited

FOREIGN PATENT DOCUMENTS

| 150313 | 11/1981 | Japan | 374/5 |
| 208429 | 12/1981 | Japan | 73/40 |
| 396609 | 8/1973 | U.S.S.R. | 374/5 |

Primary Examiner—Jerry W. Myracle
Assistant Examiner—Joseph W. Roskos
Attorney, Agent, or Firm—Keaty & Keaty

[57] ABSTRACT

An apparatus and method is disclosed for testing leaks in welds securing a wellhead to a caisson on which the wellhead is mounted without waiting for the welds to cool. The wellhead is placed in co-axial, overlapping relationship around a portion of the caisson on which it is to be mounted to form an annular chamber between the caisson and wellhead. The chamber has an open annular upper junction and an open annular lower junction formed by the overlap between the wellhead and caisson, and a continuous weld is placed along each of these junctions to secure the wellhead to the conduit. Oil is heated to a temperature similar to the temperature of the welds, wellhead and caisson after welding, and this oil is introduced into the chamber before the welds, wellhead and caisson have cooled to test for leaks in the welds. An apparatus for introducing the heated fluid into the chamber is also disclosed, and the apparatus comprises a cylindrical, sealed container for the oil with a heating jacket wrapped around the container for transmitting heat to the container. Cold oil is introduced into the top of the container under pressure, thereby forcing heated oil out of the container, through an outlet tube and to the chamber. This apparatus and method permits testing of welds while they are still hot, thereby eliminating the necessity of waiting for the welds, wellhead and conduit to cool.

20 Claims, 2 Drawing Figures

APPARATUS AND METHOD FOR INSPECTING WELDS

BACKGROUND OF THE INVENTION

1. Field of the Invention

The present invention relates to a method for detecting leaks in welds securing a first annular conduit to a second annular conduit wherein the conduits are attached to one another by a pair of annular welds with a chamber therebetween, the chamber being formed by the overlapping of the conduits. More particularly, this method relates to testing for leaks in welds securing a wellhead to a caisson on which the wellhead is mounted by introducing heated oil into a chamber between a pair of annular welds which secure the wellhead to the caisson. This invention also concerns an apparatus for introducing heated fluid into the chamber for testing for leaks in the welds.

2. General Background

In the drilling of oil and gas wells, a caisson is placed into the ground through which oil and gas travels to the surface of a land formation or body of water. A wellhead is conventionally placed on top of the conduit for controlling the flow of liquid, and is secured to the caisson by welding. Typically, the wellhead has an inner diameter portion which is greater than the outer diameter of the caisson, and this enlarged inner diameter portion permits the wellhead to the co-axially aligned and overlappingly disposed around the caisson. The overlapping portion of the wellhead creates an annular chamber between the caisson and wellhead, the chamber having an open annular upper juncture on the interior of the caisson and wellhead, and an open, annular lower juncture on the exterior of the caisson and wellhead. These junctures are each closed by a continuous weld to sealingly engage the wellhead to the caisson. If the welds do not sealingly engage the wellhead and caisson, oil being obtained from the land formation can leak out through the welds.

It has been known in the art to introduce a testing fluid, such as oil, into the chamber between annular welds to determine if the welds will leak when the well is in use. However, introduction of oil into the annular chamber too soon after welding causes cracking of the welds, wellhead and caisson because these parts are heated to at least several hundred degrees by the welding process. Accordingly, it has been necessary to wait several hours before testing the welds. If it were then found that the welds leaked, additional welding would take place, followed by several additional hours of waiting, and then testing again. This time consuming procedure could be repeated ad infinitum until the welds were found not to leak.

It is an object of this invention to provide a method of testing for leaks in the welds securing a wellhead to a caisson without waiting for the welds to cool.

It is still a further object of this invention to provide a method of testing welds for leaks in any pair of overlapping conduits secured to one another by a pair of annular welds having a chamber therebetween formed by the overlapping of the conduits.

It is also an object of the invention to provide a convenient and portable apparatus for introducing heated oil into the chamber between the annular welds for testing the welds securing a wellhead to a caisson.

SUMMARY OF THE INVENTION

The aforementioned objects have been achieved by providing a method of testing for leaks in welds securing a wellhead to a caisson on which it is to be mounted. The wellhead is placed in co-axial, overlapping relationship around a portion of the caisson to form an annular chamber between the caisson and wellhead. This chamber has an open annular upper juncture of the interior of the wellhead and caisson and an open annular lower juncture on the exterior of the wellhead and caisson. A first continuous, annular weld is placed along the upper juncture and a second, annular continuous weld is placed along the lower juncture to secure the wellhead to the caisson.

Oil is heated to a temperature of 200° to 450° F., or preferably 300° to 400° F., or any other temperature similar to the temperature of the welds, weldhead and caisson after welding but below the flash point of the oil. The heated oil is then introduced into the chamber before the welds, wellhead and caisson have cooled by pumping oil from the container in which it is heated to the chamber between the annular welds. In this manner, testing can be performed soon after welding without waiting for the heated parts to cool.

The apparatus for heating oil and introducing it into the chamber is a cylindrical, sealed container with a heating jacket wrapped around it for transmitting heat to the container. The container is pressurized and provided with an outlet tube projecting into the container through a top thereof and terminating adjacent the bottom thereof on the interior of the container. An extension on the tube provides a fluid conduit between the interior of the container and the chamber. An inlet through the top of the container is provided through which additional oil is moved into the container from a pump to force oil through the outlet tube and into the chamber.

BRIEF DESCRIPTION OF THE DRAWINGS

For a further understanding of the nature and objects of the present invention, reference should be had to the following detailed description taken in conjunction with the accompanying drawings in which like parts are given like reference numerals and wherein.

DETAILED DESCRIPTION OF THE PREFERRED EMBODIMENT

Figure 1:
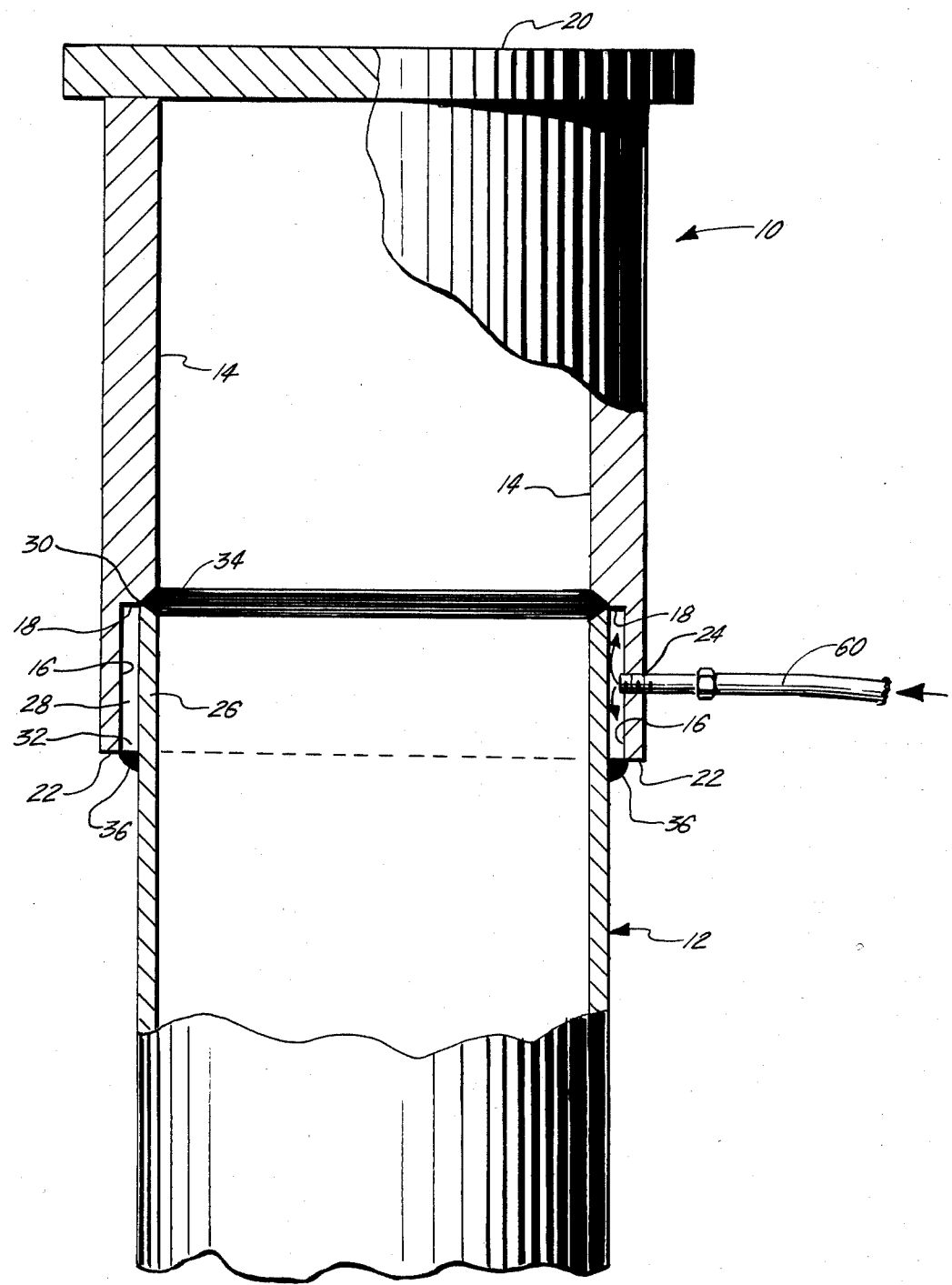
FIG. 1 is a side elevational view of the wellhead and caisson, partially in cross-section, showing the junction between the wellhead and caisson on which it is mounted.

The method described below concerns a method of testing for leaks in welds securing a wellhead to a caisson on which it is mounted. However, it is apparent that the same method can be used to test for leaks in annular welds securing a first annular conduit to a second annular conduit. In the following description, the caisson can be construed to be a first annular conduit and the wellhead can be construed to be a second annular conduit.

The method of testing for leaks in welds securing an annular wellhead 10 to an annular caisson 12 on which it is mounted, comprises the following steps. The wellhead is provided with a first, reduced inner diameter portion 14 and a second, enlarged inner diameter portion 16, with a flat, annular shoulder 18 formed by the change in inner diameters of wellhead 10. Wellhead 10 has an annular open mouth 20 an annular open bottom defined by annular edge 22 of wellhead 10. An orifice 24 is also provided at one point between shoulder 18 and edge 22 of wellhead 10.

Caisson 12 is an annular metal conduit having a constant inner diameter substantially equal to the inner diameter of portion 14 of wellhead 10. The outer diameter of caisson 12 is greater than the inner diameter of portion 14, but less than the inner diameter of portion 16. Because of these relationships, wellhead 10 can be placed in co-axial, overlapping relationship around top portion 26 to caisson 12 to form an annular chamber 28 between portion 16 of wellhead 10 and top portion 26 of caisson 12. The shoulder 18 of wellhead 10 rests on the upper lip of top portion 26 of caisson 12, but since the juncture between shoulder 18 and top portion 26 is not sealed it will be referred to as an open annular upper juncture 30. Portion 16 depends downwardly around top portion 26 of caisson 12, and edge 22 forms an open lower juncture 32 between portion 16 and top portion 26.

A first continuous annular weld 34 is placed along upper juncture 30 to close that juncture with the aim of providing an oil tight seal. Similarly, a lower continuous annular weld 36 is placed along lower juncture 32 to also provide an oil tight seal. This pair of annular welds 34, 36 secure wellhead 10 to caisson 12.

The next step of the method is to heat oil to a temperature similar to the temperature of the welds. The temperature of the welds will vary depending on the type of welding procedure used, and once the welding stops the temperature of the weld and surrounding metal begins to decrease rapidly. It has been found, however, that if the oil is heated to a temperature between 200° and 450°, F., preferably 300° to 400° F. the temperature of the oil will be similar enough to the temperature of the welds 34, 36, wellhead 10 and caisson 12 after welding to prevent cracking or fracturing of any of the heated metal. The oil that is heated is a high flash point oil of the kind known in the art having a combustion temperature above the temperature to which the oil is being heated. The heated oil is then introduced into annular chamber 28 within a few minutes after welding has taken place, i.e. before the welds, wellhead and caisson have cooled. This oil is introduced into annular chamber 28 through orifice 24 under pressure in a manner to be described below.

Figure 2:
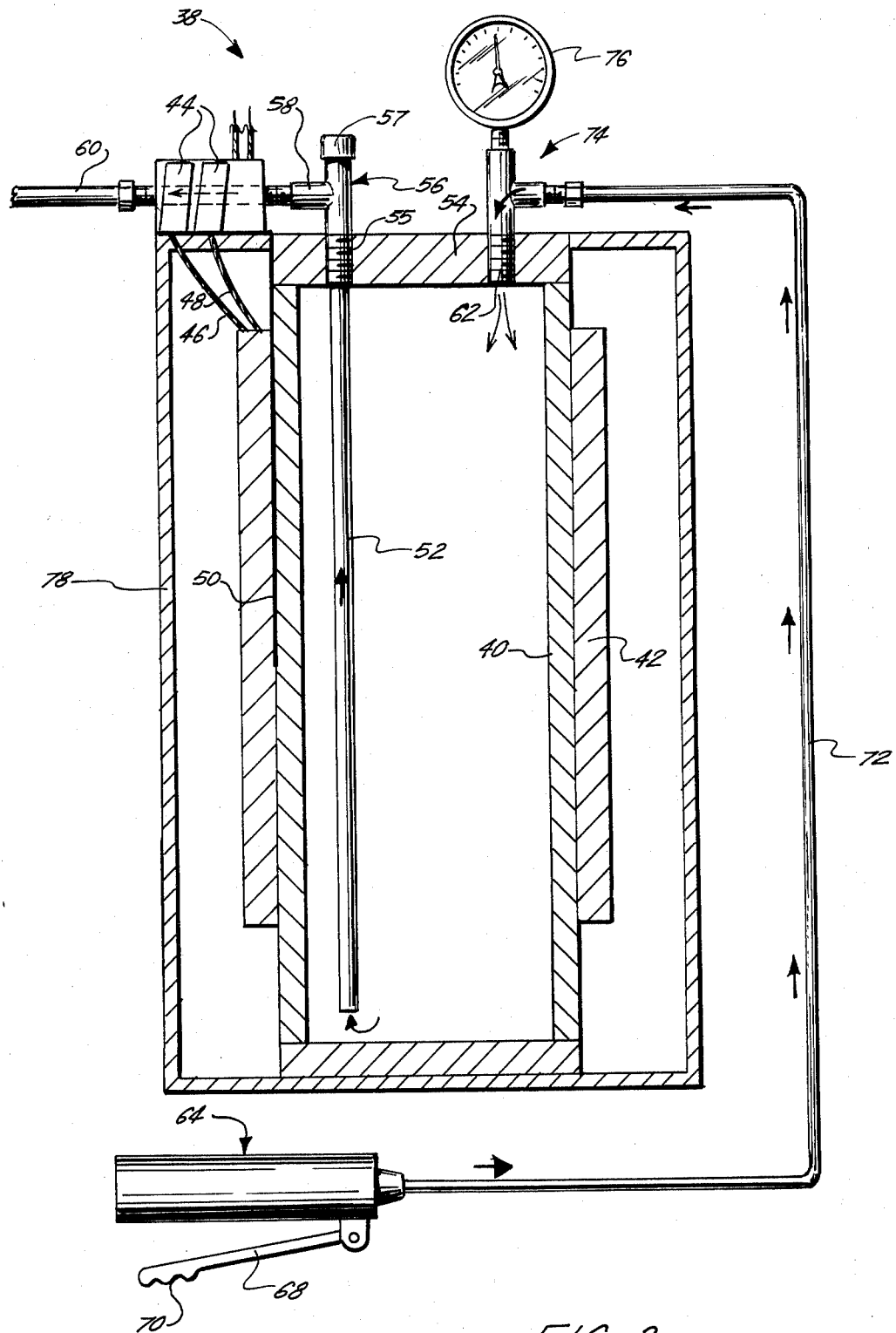
FIG. 2 is a view of the apparatus for introducing heated oil into the chamber between the annular welds securing the wellhead to the caisson, the apparatus being shown partially in cross-section.

The oil or other fluid which is chosen for introduction into chamber 28 can be heated in a heater 38 shown in FIG. 2. The heater comprises a cylindrical, sealed container 40 rated to a burst pressure of, for example, 4,000 psi. Oil is placed in the container to be heated filling it to about three-quarters capacity. A heating jacket 42 is placed around container 40 for transmitting heat to container 40. Jacket 42 is, in the preferred embodiment shown, a cylindrical, metallic heating element in contiguous, annular relationship to container 40, which is also made of metal. Jacket 42 is heated by means of a supply of electrical energy from elements 44 which convey the electrical energy through wires 46, 48.

An annular thermostat 50 is provided between container 40 and jacket 42 for monitoring and controlling the temperature to which heating jacket 42 is heated. When the temperature rises higher than desired, thermostat 50 negatively inhibits elements 44 from heating jacket 42 until the temperature of jacket 42 has dropped to a desirable, sufficiently low temperature. In this manner, the temperature of oil in container 40 can be regulated to keep it hot enough to prevent cracking of welds when the oil is introduced into the chamber, yet preventing the oil from being heated above its flash point, which would cause an explosion.

An outlet tube 52 projects into container 40 through a top plate 54 of container 40. Top plate 54 is provided with a cylindrical aperture into which one arm 55 of a tee 56 is placed in fluid sealing relationship. Arm 55 can be, for example, externally threaded for mating with internal threads in the aperture through top plate 54. The other arm 57 of tee 56 can be sealed. The perpendicular extension 58 of tee 56 is connected in fluid sealing relationship to an extension tube 60 which leads to annular chamber 28. An inlet 62 is provided through top 54 of container 40 through which additional oil at ambient temperature is moved into container 40 to force heated oil from container 40 through outlet tube 52, into extension tube 60 and thence to chamber 28. A hand held hydraulic pump 64 is comprised of a hollow cylinder having a pivotally mounted handle 68 with hand grip 70. Pump 64 is a conventional hydraulic pump having a piston which is advanced by pivotal movement of handle 68 to force oil out of pump 64. A tube 72 fluidly connects pump 64 to inlet 62 through a tee 74. Pressure gauge 76 is mounted on one arm of tee 74 to monitor the pressure inside container 40 as additional oil is introduced into container 40.

In the preferred embodiment shown in FIG. 2, container 40 and heating jacket 42 are enclosed within cylindrical, metal casing 78 to provide additional protection for container 40. The area between jacket 42 and container 78 can be filled with insulating material to provide for more efficient heating of container 40. This insulating material is not shown in FIG. 2, but is conventional in the art.

In operation, container 40 is partially filled, to about ¾ capacity, with a high flash point oil which will not ignite, in preferred embodiments, below 450° F. An example of such an oil is Super Quench TM high flash point oil sold by Gulf Oil Company and having a flash point between 375° and 400° F. Wellhead 10 is then secured to conduit 12 by means of the pair of continuous, annular welds 34, 36. The welding process results in the welds and portions of the surrounding wellhead 10 and caisson 12 being elevated to temperatures of several hundred degrees. The oil in container 24 is heated to a temperature similar to the temperature of the wellhead and caisson after welding.

Pump 64 is then employed to introduce additional oil of ambient temperature through tube 72 into container 40. Pump 64 can increase the pressure in container 40 and chamber 28 to between 250 psi and 2,000 psi. Lower pressures are used with larger diameter wellheads, and the optimum pressure for testing is 80% of the collapse pressure to which the wellhead is rated. For instance, a wellhead rated to 1000 psi would be tested with 800 psi. The additional oil at ambient temperature introduced into container 40 forces heated oil out of container 40, through outlet tube 52 and tee 56 and into extension tube 60.

Once heated oil moves out of container 40 into extension tube 60, it is then conveyed through orifice 24 in wellhead 10 into annular chamber 28 between continuous welds 34, 36. The heated oil fills chamber 28 without causing stress in the metals which would result if there were a significant temperature differential between the oil and its metallic surroundings. If welds 34, 36 are truly continuous, oil will not leak out of chamber 28 past them. This indicates that the welds are secure and oil or gas production can begin. However, if the oil entering chamber 28 under pressure does leak through welds 34, 36, the welds can be redone at the points of leakage. More pressurized oil can then be introduced into chamber 28 without the necessity of waiting for the welds and surrounding metal structure to cool.

Changes and modifications in this specifically described embodiment can be carried out without departing from the scope of the invention which is intended to be limited by the scope of the appended claims.

I claim:

1. A method of testing for leaks in the welds securing a first annular conduit to a second annular conduit, comprising the steps of:
   providing first and second adjacent, coaxially aligned conduits, an open end of the first conduit receiving therein an open end of the second conduit in overlapping, co-axially aligned relationship, the areas of overlap of the two conduits forming an annular chamber between the overlapping conduits, the chamber having an open upper juncture and an open lower juncture;
   placing a continuous weld along the upper juncture and a continuous weld along the lower juncture to secure the first conduit to the second conduit;
   heating a fluid to a temperature similar to the temperature of the conduit and welds after welding;
   introducing the heated fluid into the chamber before the welds have cooled to test for leaks.

2. The method of claim 1 wherein the fluid is oil having a flash point higher than the temperature to which the oil is to be heated.

3. A method of testing for leaks in a pair of annular welds securing a first conduit in coaxial alignment to a second conduit, the annular welds having an annular chamber therebetween formed by the overlapping of the conduits, the method comprising the steps of:
   heating a fluid to a temperature similar to the temperature of the conduits and welds after welding; and
   introducing the heated fluid into the chamber before the welds have cooled to test for leaks in the welds.

4. The method of claim 3 wherein the heated fluid is introduced into the chamber under pressure.

5. The method of claim 4 wherein the fluid is oil having a flashpoint higher than the temperature to which the oil is to be heated.

6. A method of testing for leaks in welds securing a weldhead to a caisson on which it is to be mounted, comprising the steps of:
   placing the wellhead in coaxial, overlapping relationship around a portion of the caisson to form an annular chamber between the conduit and the wellhead, the chamber having an open annular upper juncture;
   placing a continous weld along the upper juncture and a continuous weld along the lower juncture to secure the wellhead to the conduit;
   heating a fluid to a temperature similar to the temperature of the welds, wellhead and caisson after welding;
   introducing the fluid into the chamber before the welds, wellhead and caisson have cooled to test for leaks in the welds.

7. The method of claim 6 wherein the fluid is oil having a flash point higher than the temperature to which the oil is heated.

8. The method of claim 7 wherein the oil is introduced into the chamber under pressure from a hydraulic pump.

9. The method of claim 8 wherein the oil is heated in a heater comprising:
   a container for the oil;
   a heating jacket in heat transmitting relationsip to the container; and
   means for conveying heated oil from the container to the chamber.

10. The method of claim 9 wherein the means for conveying heated oil from the container to the chamber comprises:
    an outlet tube through which heated oil moves from the container to the chamber; and
    an inlet through which additional oil is moved into the container to force oil through the outlet tube and into the chamber.

11. The method of claim 10 wherein the hydraulic pump is in fluid communicating relationship with the inlet for moving oil at ambient temperature through the inlet into the container to force heated oil out of the container through the outlet tube and to the chamber.

12. The method of claim 11 wherein the heating jacket is further provided with a thermostat for regulating the temperature to which the oil in the heater is heated.

13. A method of testing for leaks in welds securing a wellhead to a caisson on which it is mounted, comprising the steps of:
    placing the wellhead in coaxial, overlapping relationship around a portion of the caisson to form an annular chamber between the caisson and wellhead, the chamber having an open annular upper juncture and an open annular lower juncture;
    placing a continous weld along the upper juncture and a continous weld along the lower juncture to secure the wellhead to the caisson;
    heating oil to a temperature similar to the temperature of the welds, wellhead and caisson after welding wherein the oil is heated in a heater comprising:
    a cylindrical, sealed container for the oil;
    a heating jacket wrapped around the container for transmitting heat to the jacket;
    a thermostat between the container and jacket for monitoring and controlling the temperature to which the heating jacket is heated;
    an outlet tube projecting into the container through a top thereof and terminating adjacent a bottom therof, an extension on the tube providing a fluid conduit between the container and chamber;
    an inlet through the top of the container through which additional oil at ambient temperature is moved into the container to force oil through the outlet tube and into the chamber;
    a pump in fluid communicating relationship with the inlet and from which the additional oil is moved through the inlet into the container; and
    an insulating jacket around the container and heating jacket;
    introducing the oil into the chamber before the welds, wellhead and caisson have cooled to test for leaks in the welds by pumping oil from the container to the chamber.

14. An apparatus for introducing heated fluid into a chamber, comprising:
a sealed container for the fluid;
a heating jacket in heat transmitting relationship to the container; and
means for conveying heated fluid from the container to the chamber between a pair of annular welds to detect leaks in the welds.

15. The apparatus of claim 14 wherein the means for conveying heated oil from the container to the chamber comprises:
an outlet tube through which fluid moves from the container to the chamber; and
an inlet through which additional fluid is moved into the container to force fluid through the outlet tube and into the chamber.

16. The apparatus of claim 15 wherein the heater further comprises a pump in fluid communicating relationship with the inlet and from which fluid is moved through the inlet into the container.

17. The apparatus of claim 16 wherein the fluid is oil having a flash point higher than the temperature to which the oil is to be heated.

18. The apparatus of claim 16 wherein the heating jacket is provided with a thermostat for regulating temperatures to which the fluid in the container is heated.

19. An apparatus for introducing heated oil into a chamber, comprising:
a cylindrical, sealed container for the oil;
a heating jacket wrapped around the container for transmitting heat to the container;
a thermostat between the container and jacket for monitoring and controlling the temperature to which the oil in the container is heated;
an outlet tube projecting into the container through a top thereof and terminating adjacent the bottom thereof;
an inlet through the top of the container through which additional oil is moved into the container to force oil through the outlet tube and into the chamber;
a pump in fluid communicating relationship with the inlet and from which the additional oil is moved through the inlet into the container; and
an insulating jacket around the container and heating jacket.

20. A method of testing for leaks in a continuous weld which closes a chamber, comprising:
heatng a fluid to a temperature similar to the temperature of the weld and chamber after welding;
introducing the heated fluid into the chamber before the weld has cooled to test for leaks, the fluid being oil having a flash point higher than the temperature to which the oil is heated.

* * * * *